(12) United States Patent
Larsson et al.

(10) Patent No.: US 7,355,548 B2
(45) Date of Patent: Apr. 8, 2008

(54) PROCESSING OF TANK SIGNAL IN RADAR LEVEL GAUGE SYSTEM

(75) Inventors: Lars Larsson, Linköping (SE);
Marianne Öder, Linköping (SE);
Katarina Vilhelmsson, Linköping (SE);
Jan Westerling, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 152 days.

(21) Appl. No.: 11/219,090

(22) Filed: Sep. 1, 2005

(65) Prior Publication Data
US 2007/0046528 A1    Mar. 1, 2007

(51) Int. Cl.
*G01S 13/08* (2006.01)
(52) U.S. Cl. ............... 342/124; 342/196; 73/290 R
(58) Field of Classification Search ............ 324/332, 324/629, 637, 642; 342/118, 124, 165, 173, 342/174, 196; 73/1.73, 290 R, 291, 304 R, 73/305, 322.5
See application file for complete search history.

(56) References Cited

U.S. PATENT DOCUMENTS

| | | | | |
|---|---|---|---|---|
| 5,438,867 A * | 8/1995 | van der Pol | ............... | 73/290 V |
| 5,841,666 A * | 11/1998 | Perdue et al. | ............... | 702/189 |
| 6,078,280 A * | 6/2000 | Perdue et al. | ............... | 342/124 |
| 6,229,476 B1 * | 5/2001 | Lutke et al. | ............... | 342/124 |
| 6,415,660 B1 | 7/2002 | Sinz et al. | ............... | 73/290 |
| 6,445,192 B1 * | 9/2002 | Lovegren et al. | ........... | 324/644 |
| 6,690,320 B2 * | 2/2004 | Benway et al. | ............... | 342/124 |
| 6,972,712 B1 * | 12/2005 | Karlsson | ............... | 342/124 |
| 7,227,495 B2 * | 6/2007 | Bletz et al. | ............... | 342/124 |
| 7,233,278 B2 * | 6/2007 | Eriksson | ............... | 342/124 |
| 7,239,267 B2 * | 7/2007 | Edvardsson | ............... | 342/124 |
| 7,255,002 B2 * | 8/2007 | Gravel et al. | ............... | 73/290 V |
| 7,284,425 B2 * | 10/2007 | Wennerberg et al. | ..... | 73/290 V |
| 2002/0112774 A1 | 8/2002 | Gaiser | ............... | 141/1 |
| 2004/0045353 A1 * | 3/2004 | Patel | ............... | 73/290 R |
| 2004/0145510 A1 * | 7/2004 | Edvardsson | ............... | 342/5 |

(Continued)

FOREIGN PATENT DOCUMENTS

DE          33 37 690       10/1983
WO    WO 2005/062000       7/2005

OTHER PUBLICATIONS

"International Search Report", PCT/SE2006/000996, filed Aug. 31, 2006; 5 pages.

*Primary Examiner*—John B Sotomayor
(74) *Attorney, Agent, or Firm*—Westman, Champlin & Kelly, P.A.

(57) ABSTRACT

A method and a system for processing a reflected microwave signal generated by a radar level gauge system arranged to transmit microwaves towards the material in the tank, and receive a reflection of said microwave signal as a tank signal. The tank signal is processes by a plurality of processes, each process being adapted to determine a process variable in a specific region of the tank, each specific region corresponding to a predefined propagation distance range.

Such multi-processing of the received tank signal has the advantage that each process can be optimized to that particular region of the tank. More specifically, a process concerned with a particular region of tank only needs to treat a portion of the tank signal.

21 Claims, 4 Drawing Sheets

U.S. PATENT DOCUMENTS

| | | | |
|---|---|---|---|
| 2005/0083229 A1* | 4/2005 | Edvardsson et al. | 342/124 |
| 2005/0285777 A1* | 12/2005 | Karlsson | 342/124 |
| 2006/0044145 A1* | 3/2006 | Akerstrom et al. | 340/612 |
| 2006/0137446 A1* | 6/2006 | Wennerberg et al. | 73/290 V |
| 2007/0028829 A1* | 2/2007 | Griessbaum et al. | 114/343 |
| 2007/0046528 A1* | 3/2007 | Larsson et al. | 342/124 |
| 2007/0101810 A1* | 5/2007 | Eriksson et al. | 73/290 V |
| 2007/0188396 A1* | 8/2007 | Griessbaum et al. | 343/786 |
| 2007/0194981 A1* | 8/2007 | Hagg et al. | 342/124 |
| 2007/0236385 A1* | 10/2007 | Kleman et al. | 342/124 |
| 2007/0251960 A1* | 11/2007 | Al-Misfer | 222/590 |

* cited by examiner

PROCESSING OF TANK SIGNAL IN RADAR LEVEL GAUGE SYSTEM

FIELD OF THE INVENTION

The present invention relates to radar level gauge (RLG) systems. In such systems, microwaves are emitted into a tank and a reflected tank signal is received. Based on signal processing of this reflected signal, a process variable such as the level of a content in the tank can be determined.

BACKGROUND OF THE INVENTION

Such RLG systems typically include a signal generator, means to emit the signal into the tank, and a receiver for receiving the reflected tank signal. The received signal can for example be a time domain reflectometry (TDR) signal or a frequency domain signal, such as a frequency modulated continuous wave (FMCW) signal. The received signal typically comprises at least a surface reflection (echo) caused by an interface between different materials in the tank, typically but not necessarily a liquid surface. Normally, the received signal also includes various interfering reflections caused e.g. by the bottom and walls of the tank or the transition between the signal generator and the wave guide.

In order to improve the accuracy of the measurement result, the signal processing of the received signal can be adapted to compensate the received signal for such interfering reflections. However, the signal processing is typically optimized in terms of general precision in the entire tank, and is not necessarily optimal in all areas of the tank. Therefore, in addition to the RLG system, additional sensors are sometimes arranged in the tank, in order to provide information about conditions in specific regions of the tank.

One such region of special importance is the near zone, i.e. in a region close to the entry of microwaves into the tank. In an RLG, the measurement process can be complicated or even made impossible, when the surface reflection occurs in this near zone, which can be in the range of 0 m to 2 m depending on the type of microwave signal used. The problems are caused by an interfering reflection caused by the transition between a signal transfer medium and the emitter/receiver in the tank, in combination with the limited bandwidth limiting the resolution. RLG systems may be provided with specific signal processing to handle such problems.

At the same time, for security reasons it is very important to have a secure indication of if and when the surface of the contents in the tank approaches the top of the tank, i.e. some kind of overfill sensing system. Therefore, one example of an additional sensor mentioned above is an overfill sensor, arranged in the top of the tank and adapted to detect when the level exceeds a certain level. Although the normal measurement processing may be adapted to provide accurate measurements also in the top of the tank (referred to as the near zone), such a redundant sensor system is required by authorities in many countries.

GENERAL DISCLOSURE OF THE INVENTION

It is an object of the present invention to provide information about conditions in specific regions of the tank, without the need for additional sensors.

This and other objects are achieved by providing a radar level gauging method and system for processing a tank signal comprising consecutive tank signal portions each corresponding to a measurement cycle, wherein each portion of the received tank signal is processed in a plurality of processes, each process being adapted to determine a process variable in a specific region of the tank, each specific region corresponding to a separate predefined propagation distance range.

The term "measurement cycle" is here used to indicate the cyclic process of determining a measurement result. The cycles are not necessarily equal in length, and the content of the transmitted signal may also very between different cycles. In a pulsed RLG, a measurement cycle corresponds to the transmission of one pulse, while in a FMCW RLG a measurement cycle corresponds to one sweep of frequencies. As each portion of the tank signal corresponds to one measurement cycle, each of the plurality of processes will be performed on information from each measurement cycle.

One region may be the area closest to the signal entry into the tank (referred to as the near zone), while another region may be the area furthest away from the signal entry into the tank. In a vertically oriented tank, the regions corresponding to different propagation distance ranges will relate to vertical layers of the tank, e.g. a top region and a bottom region.

Such multi-processing of the received tank signal has the advantage that each process can be optimized to that particular region of the tank. More specifically, a process concerned with a particular region of tank only needs to treat a limited content of the tank signal. In the case of a time domain reflectometry signal, the process only needs to handle a limited time range, and in the case of a frequency domain tank signal, the process only needs to handle a limited frequency range. The processing is thus simplified, and such a regionally limited process can be made more robust.

It should be noted that the regions may overlap, so that a portion of the tank may be covered by several regions. The tank signal relating to this region will this be processed in several processes. Thus will be the case, for example, if one process handles essentially the entire tank, in order to obtain a measurement result, while other processes only handle smaller sub-regions, in order to provide more robust measurements of these specific regions.

Such a regionally limited process can include subtracting a compensation signal from the tank signal, which compensation signal includes background information about the region of interest, also referred to as a "signature". Such a compensation signal can be formed using a tank signal in which the surface reflection occurs at a distance from the region of interest, and then extracting the portion of the tank signal relating to the region of interest.

In a pulsed, time domain, system, the relevant portion of the tank signal may be extracted by selecting a time range of the signal.

In a frequency domain system, such as an FMCW system, the compensation signal can be formed by low pass or band pass filtering a tank signal received when no surface reflection occurred inside the region of interest.

For a bottom region of the tank, a compensation signal can be formed by saving a tank signal from a measurement cycle when the surface reflection is close to the bottom.

In any case, an updated compensation signal $CS_n^*(t)$ can be formed by combining the compensation signal $CS_n(t)$ with a previous compensation signal $CS_{n-1}(t)$, according to $$CS_n^*(t)=aCS_n(t)+(1-a)CS_{n-1}(t),$$

where a is a weight factor between zero and 1.

One example of a regionally limited process can be a near zone process, especially adapted for the near zone, suitable for providing an overfill detection system. This embodiment of the invention is based on the realization that while a redundant overfill sensing system is often required, the RLG system itself is in fact capable of providing such sensing, as long as the suitable signal processing is applied. By applying such signal processing in a separate measurement process, a redundant overfill detection system is provided within the RLG system, thus eliminating the need for a separate sensor.

The near zone process can be limited to treating the signal content originating from the near zone of the tank, and does therefore not have to handle interference from other regions of the tank. This makes the processing more robust, to the degree that it meets the requirements of an overfill sensing system.

According to one embodiment, a near zone process may include: for each portion of the received tank signal, subtracting a compensation signal $CS_n(t)$ based on a near zone signature of the tank from the received tank signal, and detecting a peak with an amplitude greater than a predetermined threshold in the near zone, monitoring if a peak occurs in a predetermined number of measurement cycles, and identifying a surface reflection based on said peak.

The compensation signal here includes information about the near zone of the tank, and is referred to as a near zone signature.

BRIEF DESCRIPTION OF THE DRAWINGS

These and other aspects of the present invention will be described in more detail with reference to the appended drawings, illustrating presently preferred embodiments.

DETAILED DESCRIPTION OF PREFERRED EMBODIMENTS

Figure 1:
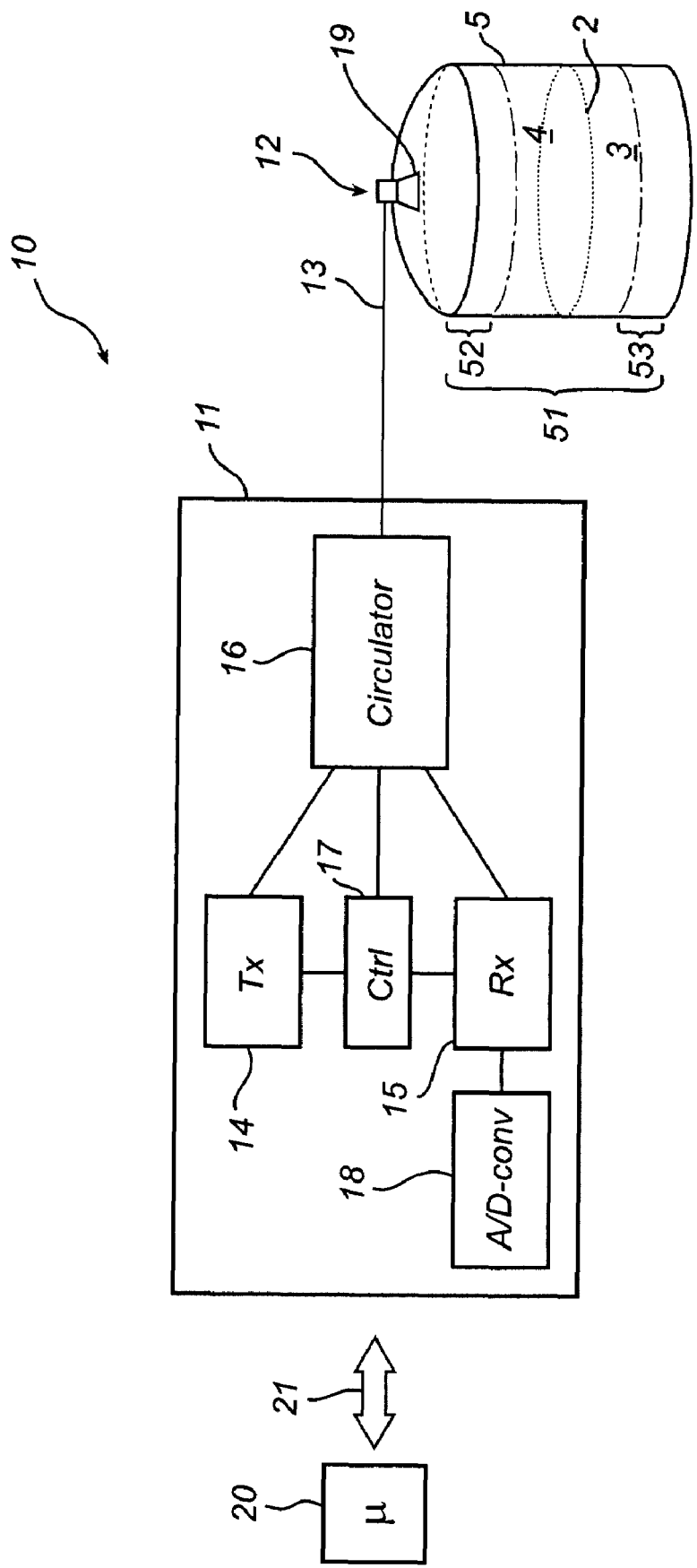
FIG. 1 shows schematically a radar level gauge system according to an embodiment of the present invention.

FIG. 1 shows a schematic block diagram of a radar level gauge (RLG) 10, in which the present invention has been implemented. The gauge 10 is arranged to perform measurements of a process variable in a tank, such as the level of an interface 2 between two (or more) materials 3, 4 in the tank 5. Typically, the first material 3 is a content stored in the tank, e.g. a liquid such as gasoline, while the second material 4 is air or some other atmosphere. In that case, the RLG will enable detection of the level of the surface of the content in the tank. Note that different tank contents have different impedance, and that the electromagnetic waves will only propagate through some materials in the tank. Typically, therefore, only the level of a first liquid surface is measured, or a second liquid surface if the first liquid is sufficiently transparent.

The RLG 10 comprises a microwave controller 11, a microwave emitter/receiver 12, and a signal transfer medium 13 connecting the emitter/receiver 12 to the controller 11. The controller 11 can comprise a transmitter 14, a receiver 15, a circulator 16 and any control circuitry 17 required to manage these components. Further, the controller 11 can comprise an A/D-converter 18 for digitizing a tank signal, i.e. a signal received from the tank.

The emitter/receiver 12 can, as shown in FIG. 1, include a free radiating antenna 19 in the top of the tank, or alternatively the emitter/receiver 12 can include a steel pipe acting as a wave guide, or a transmission probe (e.g. coaxial probe, single probe, or twin probe) extending into the tank.

The signal transfer medium 13 can be a wire or cable, but can also include more sophisticated wave guides. In case of a explosive or otherwise dangerous content in the tank 5, the signal transfer medium 13 may include an air tight seal passing through the tank wall. It is also possible that the controller 11 is connected directly to the emitter/receiver 12 with a suitable terminal, or that the emitter/receiver 12 is arranged on the same circuit board as the controller 11, in which case the signal transfer medium simply may be a track on the circuit board.

The radar level gauge 10 further includes processing circuitry 20 for communicating with the microwave controller 11 and for determining a measurement result based on a relation between transmitted and received microwaves. The controller 11 is connected to the processing circuitry 20 by a data bus 21, and is adapted to generate a microwave signal in accordance with control data from the processing circuitry 20.

In use, the processing circuitry 20 controls the microwave controller 11 to generate and transmit a measurement signal to be emitted into the tank 5 by the emitter/receiver 12. This signal can e.g. be a pulsed signal (pulsed level gauging) or a continuous signal with a frequency varying over a certain range (Frequency Modulated Continuous Wave, FMCW). The microwave emitter 12 acts as an adapter, enabling the signal generated in the controller 11 to propagate into the tank 5 as microwaves, which can be reflected by the surface of the material 3.

A tank signal, i.e. the emitted signal and its echo, or a mix of emitted and reflected signals, is received by the emitter/receiver 12, and communicated to the microwave controller 11, where it is received by receiver 15 and A/D converted by converter 18. The digitized signal is then provided to the processing circuitry 20 via bus 21, and the processing circuitry 20 determines a measurement result based on a relation between the emitted and received waves.

Figure 2:
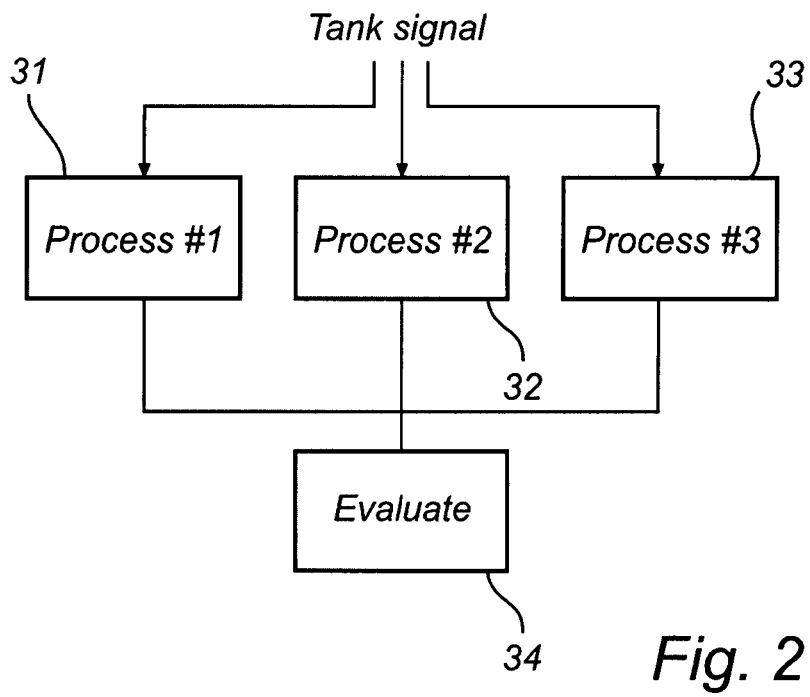
FIG. 2 shows a block diagram of the signal processing according to an embodiment of the present invention.

According to this embodiment of the present invention, the processing circuitry is arranged to process the received tank signal in a plurality of processes, each process being adapted to determine a process variable in a specific region of the tank. This is illustrated in FIG. 2. It should be noted that the processes do not need to be parallel as indicated in FIG. 2. On the contrary, they can be performed sequentially, as long as they use the same input (tank signal portion). In FIG. 2, three different processes 31, 32 and 33 are shown, each being adapted to determine a process variable in a specific region 51, 52 and 53 of the tank 5 in FIG. 1. The results from the three separate processes are evaluated in an evaluation module 34.

In the illustrated case one process 31 corresponds essentially to the conventional measurement process, and is intended to provide a measurement result, such as a tank level, that is valid in the entire tank. The process 31 thus treats the entire tank signal, and handles various types of interference that can occur in the tank.

The two other processes 32, 33 are adapted to provide measurement results such as a tank levels in a limited region, here the near zone 52 and the bottom zone 53, respectively. As these processes are only intended to provide valid results under certain circumstances, they can be made more robust, and can replace additional sensor systems sometimes required by authorities.

According to a preferred embodiment, one of the processes 32 is a near zone process, intended to function as an overfill detection process. The purpose of such a process is to securely detect any surface echo in an overfill region near the top of the tank, in order to avoid an overfill situation. If a surface echo is detected in the overfill zone, the output from the overfill protection system will be received by the evaluation module 34, and can trigger an alarm, causing a shutdown of the pumping system connected to the tank. Further, the evaluation module can be adapted to let the output from the overfill detection process 32 overrule the output from the normal measurement process 31, as the near zone process 32 is considered to be more robust in this region of the tank. In an ideal situation, the normal process 31 will detect the same surface echo as the overfill detection process 32, but there is a risk that the normal process has been disturbed by interferences from the tank and produces an erroneous result.

Figure 3:
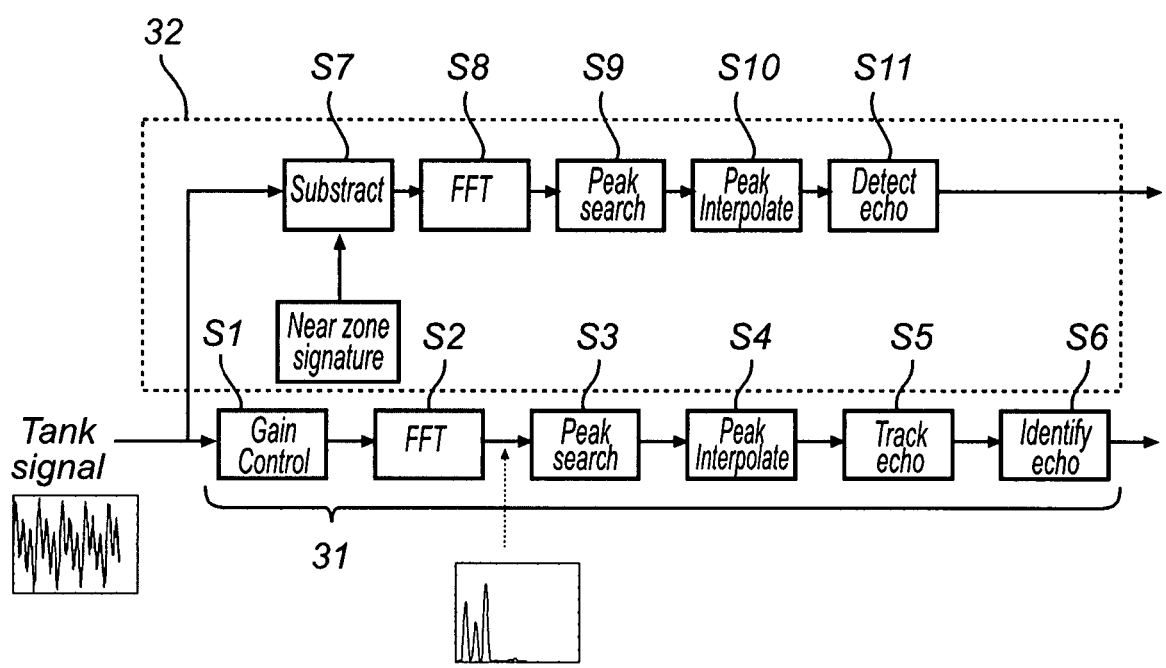
FIG. 3 shows a flowchart of two of the processes in step FIG. 2.

An overfill detection process according to an embodiment of the present invention is illustrated in more detail in FIG. 3, in a schematic block diagram showing examples of the processes 31 and 32. It should be noted that this embodiment relates to a frequency modulated continuous wave (FMCW) system. However, a similar system could be implemented in a pulsed system with only minor modifications.

As is clear from FIG. 3, the process 32 is arranged to process the same input signal (tank signal) as process 31, and also includes many of the same steps. More specifically, process 31 includes process step S1, for adapting the gain of the tank signal, step S2, for Fourier transforming the tank signal and providing a tank signal spectrum, step S3 for locating any peak in the spectrum, step S4 for determining distance from tank entry and amplitude, step S5 for tracking a surface echo, and step S6 for identifying an echo. The near zone process 32, on the other hand, includes process step S7-S11, of which steps S8-S10 essentially correspond to steps S2-S4 of process 31.

In step S7, a compensation is subtracted from the tank signal. This compensation signal includes background information from the near zone, and can be deduced from an earlier tank signal, where the surface reflection was established to be well outside the near zone. Here, as the tank signal is an FMCW signal, such a near zone signature can be generated by low pass filtering the tank signal. The low pass filtering has three purposes: first of all, it eliminates the surface reflection from the signal, secondly, it allows sampling of the compensation signal, and thirdly, it avoids high frequency content having non-stable phase.

In step S8 the tank signal is Fourier transformed to create a spectrum, just as in step S2 in process 31, and in step S9 a peak is located by simply finding a local maximum (a bin larger than its neighboring bins). In step S10 the amplitude and position of this peak is determined, which is used in the following step S11.

In step S11 it is determined if the peak represents a surface echo within the overfill region, and if so an output is generated.

Figure 4:
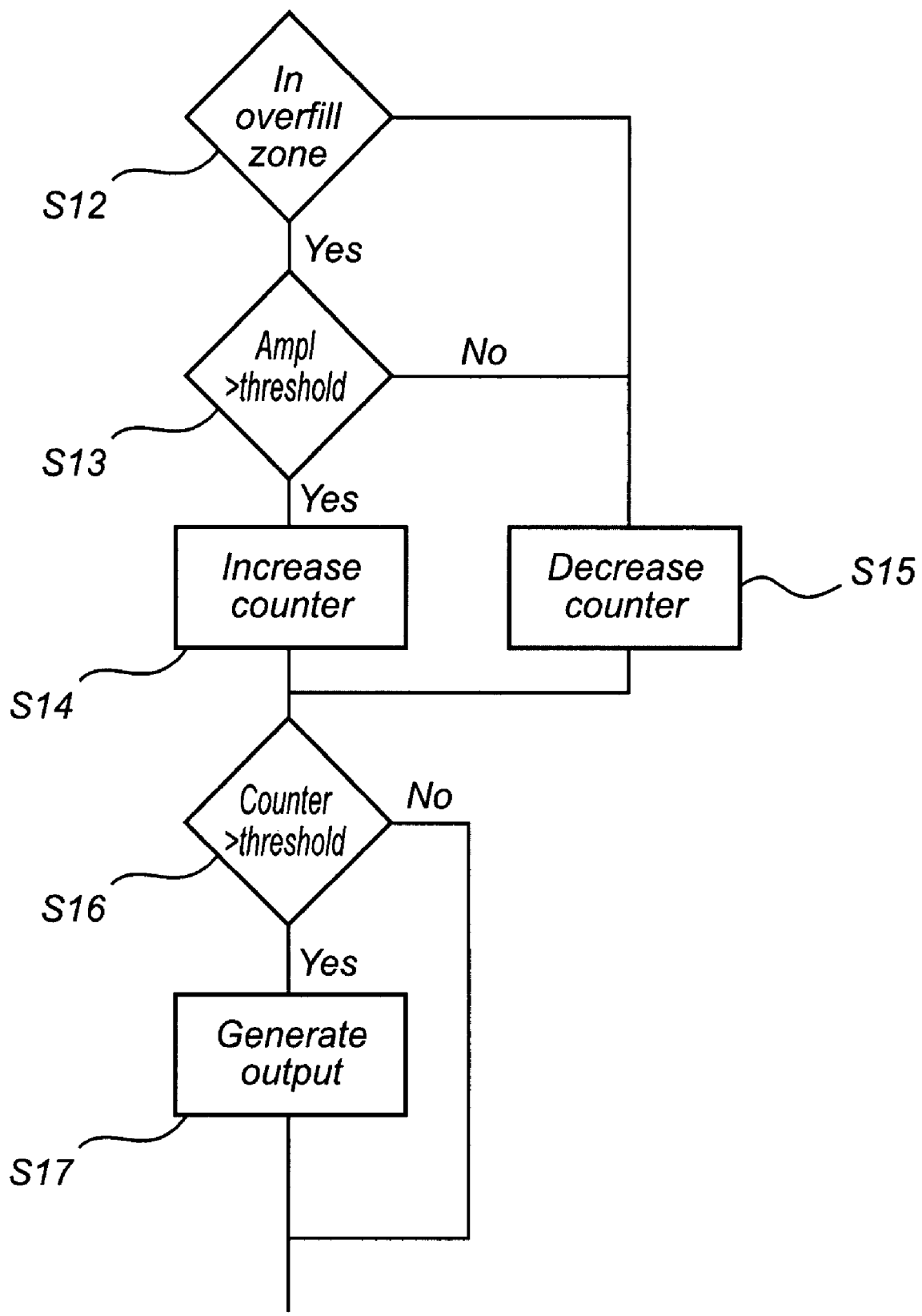
FIG. 4 shows a flow chart of the detector step in FIG. 3.

Step S11 is preferably designed so as to avoid unnecessary alarms, as this would result in unwanted costs. In a simple case, step S11 monitors the occurrences of peaks in the overfill region by a counter. This is illustrated in FIG. 4. First in step S12 it is verified that the peak is within the overfill region. In step S13 it is then verified that the amplitude of the peak is greater than a predefined threshold. If a valid peak is detected, a counter is increased in step S14, but preferably only up to a specified limit. If no valid peak is detected, the counter is decreased in step S15. Thus, each measurement cycle that a valid peak is detected in the overfill region, the counter is increased, and each cycle no peak is detected the counter is decreased. In step S16 it is checked if the counter exceeds a predefined threshold, and if this is the case, the valid peak is considered as a surface echo in the overfill region, and an output is generated instep S17. In order to make the process more robust, an hysteresis can be introduced by providing an output until the counter falls below a second threshold, lower than the first threshold.

Figure 5:
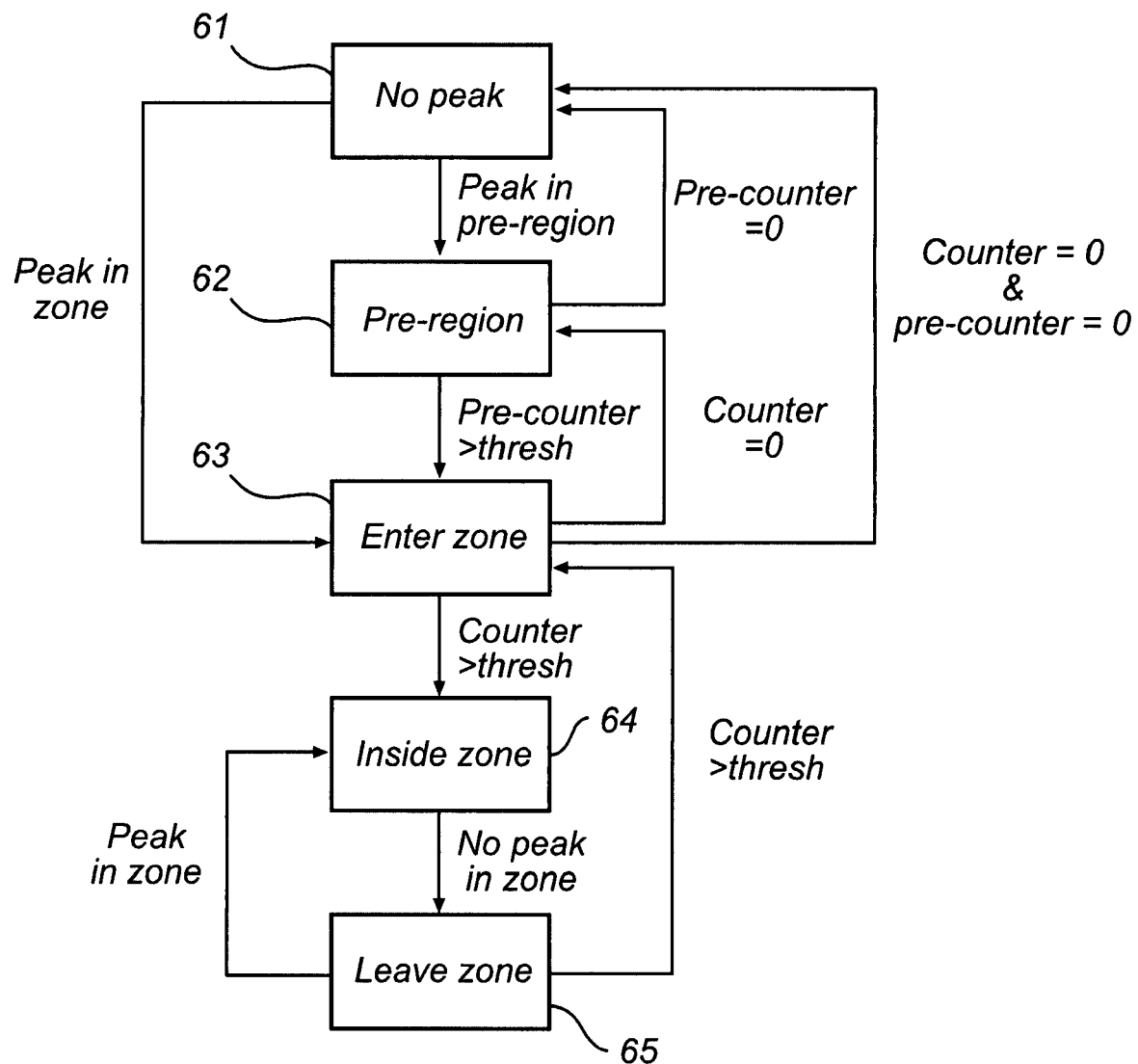
FIG. 5 shows a state model of an alternative embodiment of the detector step.

A more sophisticated process that can be implemented in step S11 is shown in FIG. 5 as a state model. According to this process, a pre-region is defined immediately outside the overfill zone, and in addition to the counter for counting peak detections in the overfill zone, there is a pre-counter for counting peak detections in the pre-region. The states 61-65 are labeled No peak, Pre-region, Enter zone, Inside zone and Leave zone.

The No peak state 61 is reached when both counters are equal to zero. As soon as a peak with sufficient amplitude is detected inside the pre-region the Pre-region state is reached. If, on the other hand a peak with sufficient amplitude is detected inside the overfill zone the Enter zone state is reached.

In the Pre-region state 62, a process similar to the one in FIG. 4 is run. The pre-counter is increased for each measurement cycle for which a valid peak is detected in the pre-region, and decreased for each cycle for which no peak is detected. During periods when the pre-counter exceeds a predefined threshold, step S11 of the overfill detection will generate an output, indicating a surface echo in the pre-region. If the pre-counter reaches zero, program control returns to the No peak state 61. If a peak instead is detected in the overfill zone, program control proceeds to the Enter zone state 63.

In the Enter zone state 63, also a process similar to FIG. 4 is run. The counter is increased for each measurement cycle for which a valid peak is detected in the overfill zone, and decreased for each cycle for which no peak is detected. If the counter reaches zero, the program control returns to the Pre-region state 62 if the pre-counter is greater than zero, or to the No peak state 61 if the pre-counter is also zero. If the counter instead exceeds a predefined threshold, the program control proceeds to the Inside zone state 64. This threshold can be different from the threshold in the Pre-region state 62.

While in the Inside zone state 64, step S11 of the overfill detection process 32 will generate an output, indicating the current position of the detected peak. Program control will remain in the Inside zone state 64 as long as peaks are detected in the overfill zone, and the counter will be increased up to a predefined level, possibly equal to the threshold in the Enter zone state 63. As soon as a measurement cycle detects no peak with a sufficient amplitude in the overfill zone, program control will proceed to the Leave zone state 65.

While in the Leave zone state 65, step S11 of the overfill detection process 32 will generate an output, indicating the position of the last detected peak. For each cycle without peak in the overfill zone, the counter will be decreased, and when below a predefined threshold, program control will return to the Enter zone state 63, and no output will be generated. This threshold is preferably lower than the threshold in the Enter zone state 63 thereby creating a hysteresis effect. If a new peak is detected in the overfill zone before the counter has fallen below this threshold, program control will instead return to the Inside zone state 64 and again output the current position of the peak.

When the near zone process 32 is implemented as an overfill detection process as described above, it may be required by regulations to ensure that the process does not fail, and various checks can be implemented for this purpose. One such check is a sweep fail check, which raises an alarm if too many measurement cycles fail, e.g. due to linearization errors or tank signal clipping. A sweep fail check can be implemented by letting a counter count each failed measurement cycle and determine a ratio between the number of failed cycles and the total number of cycles. If this ratio exceeds a given threshold, an alarm is raised.

Although described mainly with reference to a FMCW system, it should be realized that the present invention can be advantageously applicable to any RLG system. More specifically, the above described overfill detection process 32, can be adapted for a pulsed, time domain, system. Such a process will not require Fourier transformation of the tank signal, and will identify peaks in the time domain instead of in the frequency domain. The near zone signature will further not be a low pass filtered tank signal, but a selected time range from the tank signal. The overall structure of the process 32 will however remain intact.

Further, it should be noted that the number of processes is not limited to three, as shown in FIG. 2. On the contrary, an implementation of the overfill detection system described only requires two processes, and it may be advantageous to implement more than three.

What is claimed is:

1. A method for processing a reflected microwave signal used to determine at least one process variable of a content in a tank, wherein said reflected signal has been generated by a radar level gauge system arranged to transmit microwaves towards the material in the tank during consecutive measurement cycles, and receive a reflection of said microwave signal as a tank signal comprising consecutive tank signal portions each corresponding to a measurement cycle, said method comprising:
processing each portion of the received tank signal in a plurality of processes, each process being adapted to determine a process variable in a specific region of the tank, each specific region corresponding to a separate predefined propagation distance range.

2. The method according to claim 1, wherein said processes are performed in parallel.

3. The method according to claim 1, wherein the received tank signal is a frequency domain tank signal, and wherein a frequency spectrum is determined by Fourier transforming said tank signal.

4. The method according to claim 1, wherein at least one of said processes includes subtracting a compensation signal from the tank signal, said compensation signal including background information about the specific region.

5. The method according to claim 4, wherein said compensation signal $CS_n(t)$ is formed by low-pass filtering a tank signal received when no surface reflection occurred inside the specific region.

6. The method according to claim 5, wherein an updated compensation signal $CS_n^*(t)$ is formed by combining said compensation signal $CS_n(t)$ with a previous compensation signal $CS_{n-1}(t)$, according to $$CS_n^*(t)=aCS_n(t)+(1-a)CS_{n-1}(t),$$

where a is a weight factor between zero and 1.

7. The method according to claim 1, wherein at least one of said processes is a near zone detection process, adapted to detect a surface reflection in a near zone of the tank.

8. The method according to claim 7, wherein said near zone detection process comprises:
for each portion of the received tank signal, subtracting a compensation signal $CS_n(t)$ based on a near zone signature of the tank from said received tank signal, and detecting any presence of a peak with an amplitude greater than a predetermined threshold in the near zone,
monitoring the number of measurement cycles in which a peak occurs, and
identifying a surface reflection based on said peak.

9. The method according to claim 8, wherein said step of monitoring includes incrementing a counter for every measurement cycle in which a peak is detected, and decrementing said counter for every measurement cycle in which no peak is detected.

10. The method according to claim 8, wherein said peak is detected in a frequency spectrum determined by Fourier transforming said subtraction result.

11. The method according to claim 1, wherein said tank signal is a time domain reflectometry (TDR) signal.

12. A radar level gauge system used for determining a process variable of a content in a tank, comprising:
a microwave transmitter for generating a microwave signal,
means for guiding said microwave signal into the tank, and allowing it to propagate towards the content in the tank,
a microwave receiver for receiving a reflection of said microwave signal from the tank as a tank signal, comprising consecutive tank signal portions each corresponding to a measurement cycle,
processing circuitry arranged to determine said process variable based on each portion of said tank signal,
said processing circuitry being adapted to perform a plurality of processes on each portion of said tank signal, each process being adapted to determine a process variable in a specific region of the tank, each specific region corresponding to a separate predefined propagation distance range.

13. The radar level gauge according to claim 12, wherein said microwave signal is a frequency domain signal.

14. The radar level gauge according to claim 12, wherein said tank signal is a time domain reflectometry (TDR) signal.

15. The radar level gauge according to claim 12, wherein said signal guiding and propagating means include a free radiating antenna arranged inside the tank.

16. The radar level gauge according to claim 12, wherein said signal guiding and propagating means include a probe extending into the tank.

17. The radar level gauge according to claim 12, wherein at least one of said processes includes means for subtracting a compensation signal from the tank signal, said compensation signal including background information about the specific region.

18. The radar level gauge according to claim 12, wherein at least one of said processes is a near zone detection process, adapted to detect a surface reflection in a near zone of the tank.

19. The radar level gauge according to claim 18, wherein said near zone detection process comprises:
means for subtracting a compensation signal $CS_n(t)$ based on a near zone signature of the tank from said received tank signal,
means for detecting any presence of a peak with an amplitude greater than a predetermined threshold in the near zone, means for monitoring the number of measurement cycles in which a peak occurs, and means for identifying a surface reflection based on said peak.

21. The radar level gauge according to claim 19, wherein said monitoring means includes a counter arranged to be incremented for every measurement cycle in which a peak is detected, and decremented for every measurement cycle in which no peak is detected.

21. The radar level gauge according to claim 19, wherein said peak detection means are arranged to form a frequency spectrum by Fourier transforming a result from said subtraction means.

\* \* \* \* \*